R. H. DAVIES.
Spice-Cabinet.

No. 164,152.

Patented June 8, 1875.

Witnesses
Chas H Smith
Harold Serrell

Inventor
Richard H Davies
per Lemuel W Serrell
Atty.

UNITED STATES PATENT OFFICE.

RICHARD H. DAVIES, OF BOUND BROOK, NEW JERSEY.

IMPROVEMENT IN SPICE-CABINETS.

Specification forming part of Letters Patent No. 164,152, dated June 8, 1875; application filed May 3, 1875.

*To all whom it may concern:*

Be it known that I, RICHARD H. DAVIES, of Bound Brook, in the county of Somerset and State of New Jersey, have invented an Improved Spice-Cabinet, of which the following is a specification:

Ground spices are usually put up in tin canisters for shipment. These, however, are inconvenient for use when selling the spices in small quantities from such canisters, besides which they occupy considerable space in a store.

My invention consists in a spice-cabinet made of a frame containing sheet-metal drawers for the spices, and the under surfaces of the wooden partitions between the drawers are covered with sheet-tin, so that when the drawer is closed the spice is excluded from the atmosphere by the tin plate covering the open upper side of such drawer.

By this construction the spice can be safely transported in the drawers without loss, because said drawers are tight, and there is no opportunity for the aroma of the spice to escape or be absorbed by the wood of the partition; and I construct this cabinet with a recess at one side, containing a scale that is adapted to weighing the spices in the small quantities in which they are usually retailed.

Figure 1:
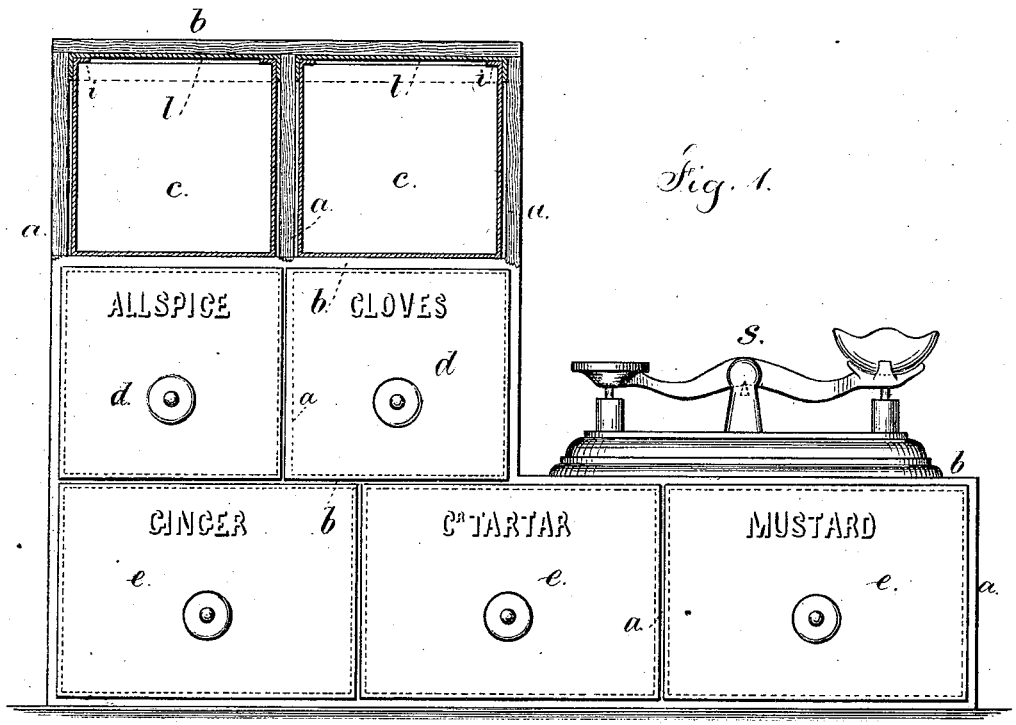
Figure 2:
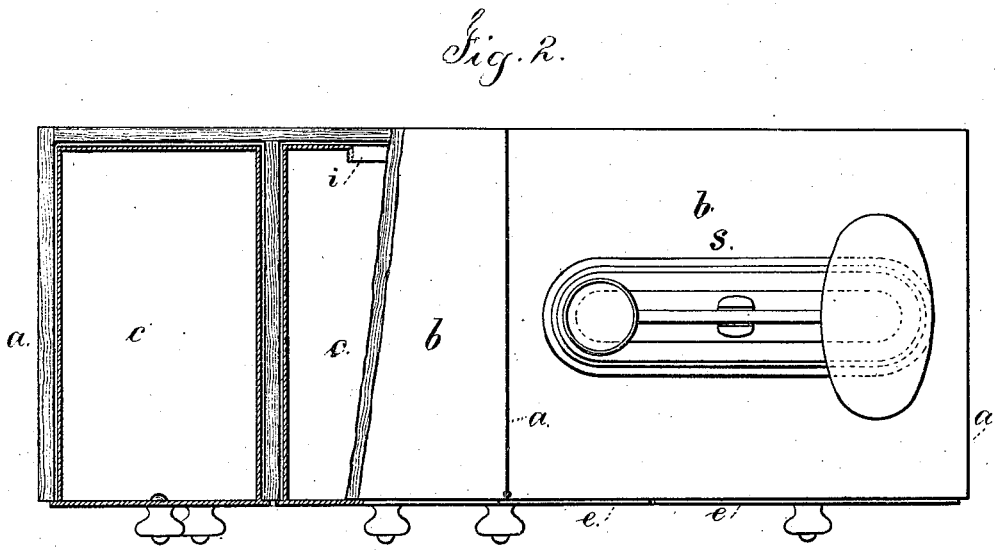

In the drawing, Figure 1 is an elevation of the cabinet, partially in section; and Fig. 2 is a plan of the same, also partially in section.

The cabinet-case is made with vertical and horizontal partitions $a$ and $b$, forming the frame for the drawers $c\ d\ e$, that are preferably in three tiers. These drawers are made of sheet metal, tinned iron being preferred, and the upper edges of the drawers are bent inwardly, to form flanges $i\ i$, that yield slightly and rest against the under sides of the horizontal partitions $b$, and hence form close joints when the drawers are closed. The under sides of these partitions $b$ are covered with the metal plate $l$, so as to prevent the spice coming into contact with the wood, and to confine the aroma.

The lower tier of boxes extends a longer distance than the upper tiers, so as to allow for the introduction of the scale $s$ in the recess or space thus formed. This arrangement has a double object: first, to raise the scale from the counter upon which the cabinet rests, and hence to keep it out of the way of injury; and, second, to allow for transporting the cabinet in a packing-box with the scale in the space thus provided for it, so that this cabinet is adapted to all the circumstances under which it may be placed, and contains the spice in transportation or in ordinary use, and also holds the accurate scale that is adapted to weighing out such spices.

I claim as my invention—

The spice-cabinet constructed substantially as described, with sheet-metal drawers, a sheet-metal covering to the under side of the horizontal partitions, and with a recess forming a scale-stand, as specified.

Signed by me this 28th day of April, A. D. 1875.

RICHD. H. DAVIES.

Witnesses:
GEO. T. PINCKNEY,
CHAS. H. SMITH.